(12) United States Patent
Lavelle et al.

(10) Patent No.: US 6,914,610 B2
(45) Date of Patent: Jul. 5, 2005

(54) GRAPHICS PRIMITIVE SIZE ESTIMATION AND SUBDIVISION FOR USE WITH A TEXTURE ACCUMULATION BUFFER

(75) Inventors: Michael G. Lavelle, Saratoga, CA (US); Wayne A. Morse, Fremont, CA (US); Rangit S. Oberoi, Saratoga, CA (US); David C. Kehlet, Los Altos, CA (US); Michael A. Wasserman, Redwood City, CA (US); Brian D. Emberling, San Mateo, CA (US); Roger C. Swanson, Morgan Hill, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 295 days.

(21) Appl. No.: 09/861,192

(22) Filed: May 18, 2001

(65) Prior Publication Data
US 2002/0180747 A1 Dec. 5, 2002

(51) Int. Cl.[7] .................................................. G09G 5/00
(52) U.S. Cl. ........................ 345/581; 345/582; 345/614; 345/552; 345/587
(58) Field of Search ............................... 345/581, 582, 345/614, 552, 587

(56) References Cited

U.S. PATENT DOCUMENTS 6,292,194 B1 * 9/2001 Powell, III ................... 345/430
6,353,438 B1    3/2002 Van Hook et al.
6,426,747 B1    7/2002 Hoppe et al.
6,480,200 B1 * 11/2002 Fisher et al. ................. 345/582
6,483,505 B1   11/2002 Morein et al.
6,490,652 B1   12/2002 Van Hook et al.

* cited by examiner

Primary Examiner—Matthew C. Bella
Assistant Examiner—Tam Tran
(74) Attorney, Agent, or Firm—Meyertons Hood Kivlin Kowert & Goetzel, P.C.; Jeffrey C. Hood; Mark K. Brightwell

(57) ABSTRACT

A graphics system configured to apply multiple layers of texture information to primitives. The graphics system receives parameters defining a primitive and performs a size test on the primitive. If the size test cannot guarantee that a fragment size of the primitive is less than or equal to a fragment capacity of a texture accumulation buffer, the primitive is divided into subprimitives, and the graphics system applies the multiple layers of texture to fragments which intersect the primitive. The graphics system switches from a current layer to the layer next when it has applied textures corresponding to the current layer to all the fragments intersecting the primitive. The graphics system stores color values associated with the primitive fragments in the texture accumulation buffer between the application of successive texture layers.

30 Claims, 8 Drawing Sheets

GRAPHICS PRIMITIVE SIZE ESTIMATION AND SUBDIVISION FOR USE WITH A TEXTURE ACCUMULATION BUFFER

CROSS-REFERENCE TO RELATED APPLICATIONS

Not applicable.

BACKGROUND OF THE INVENTION

1. Field of the Invention

This invention relates generally to the field of computer graphics and, more particularly, to high performance graphics systems for rendering graphical objects based on a decomposition of the graphical objects into primitives such as triangles, dot and lines.

2. Description of the Related Art

A graphics system may be configured to receive a stream of graphics parameters defining primitives such as triangles, lines and dots from a host application executing on a host computer. For example, the graphics system may receive a stream of vertices defining triangles in a 3D coordinate space. The triangles represent a collection of 3D objects in the 3D world coordinate space. The graphics system may operate on the triangles to generate a video stream which represents the view of a virtual camera (or virtual observer) in the 3D world coordinate space. In particular, the graphics system may compute color values for each pixel that resides within each triangle (i.e. the two-dimensional footprint of the triangle in screen space). This process of assigning color values to pixels (or samples) internal to triangles is referred to herein as triangle rasterization.

Triangle rasterization may include the application of one or more textures. In other words, graphics system may store one or more texture maps in a texture memory and may modify the color of pixels using the one or more texture maps. For example, pixels residing internal to a given triangle comprising part of a wall may be textured with three texture maps, the first map giving the triangle the appearance of brick material, the second map for putting oil smudges on the brick-textured triangle, the third map for varying the level of illumination of pixels on the oil-smudged brick-textured triangle.

According to one conventional rasterization method, each pixel in a given triangle may be textured with all N textures (from the N corresponding texture maps) before proceeding to the next pixel (interior to the triangle) along a scan line or on the next scan line. In other words, a processor may compute color values for a pixel $P_I$ by sequentially accessing a texel from texture map #1, a texel from texture map #2, . . . , a texel from texture map #N. Then after completing the computation of color values for pixel $P_I$, the processor may compute color values for the next pixel $P_{I+1}$ interior to the triangle by sequentially accessing a texel from texture map #1, a texel from texture map #2, . . . , a texel from texture map #N. This method of texturing triangles is very inefficient in its use of texture memory as the frequency of cache misses and page misses is large.

Thus, there exists a need for a graphics system and method which could more efficiently apply multiple layers of texture to primitives.

SUMMARY OF THE INVENTION

A graphics system configured to apply multiple layers of texture information to graphics primitives (e.g. triangles, dots, lines, etc.) is disclosed. In one set of embodiments, the graphics system includes a hardware accelerator, a frame buffer, a video output processor and a texture memory. The texture memory may store multiple layers of texture information.

The hardware accelerator receives graphical parameters such as vertices defining a primitive. The primitive resides in a rendering space which is tessellated with fragments (also referred to as bins). The hardware accelerator identifies fragments (i.e. bins) which geometrically intersect the primitive in rendering space, and applies the multiple layers of texture to the intersecting fragments. The hardware accelerator switches to a next texture layer once it has applied the textures of a current layer to all the fragments of the primitive. This scheme of processing fragments as the inner loop and texture layers as the outer loop may increase the average efficiency of accesses to the texture memory. The hardware accelerator includes (or couples to) a texture accumulation buffer which stores color data associated with the primitive fragments between the application of successive texture layers.

To prevent overflow of the texture accumulation buffer (TAB), the primitive may be limited to intersect a number of fragments which is less than or equal to the fragment capacity of the TAB (i.e. the maximum number of fragments the TAB can store). The number of fragments which intersect a primitive is referred to herein as the fragment size of the primitive. Before textures are applied to the primitive, the hardware accelerator performs a size test on the primitive. The size test determines if the fragment size of the primitive is less than or equal to the TAB fragment capacity, or more generally, if an upper bound for the fragment size is less than or equal to a lower bound for the TAB fragment capacity. If the size test fails, i.e. indicates that the fragment size is too large relative to the TAB fragment capacity, the hardware accelerator divides the primitive into subprimitives. The subprimitives have fragment sizes smaller than the TAB fragment capacity.

A number U is said to be an upper bound for a number X if U is greater than or equal to X. A number L is said to be a lower bound for a number X if L is less than or equal to X. Thus, X is itself a lower bound and an upper bound for X.

In one embodiment, the hardware accelerator may be configured to perform the size comparison on a given primitive by (1) computing a width value and height value for the first primitive, (2) determining a bit position $\alpha$ of a leading one in the width value, (3) determining a bit position $\beta$ of a leading one in the height value, and (4) comparing a sum of the bit position $\alpha$ and the bit position $\beta$ to a threshold value. The threshold value is determined by the TAB fragment capacity. For example, the threshold value may equal the bit position of a leading one in a binary representation of the TAB fragment capacity.

In one collection of embodiments, the hardware accelerator may be configured to incorporate more information from the width and height than just the bit positions $\alpha$ a and $\beta$. The hardware accelerator may additionally generate a mantissa for the width value and a mantissa for the height value, and compute an upper bound for the primitive's fragment size based on the bit positions $\alpha$ and $\beta$ and the mantissas. Because the upper bound incorporates finer information, the upper bound may more tightly bound the fragment size than when only the bit position information is used. The upper bound may be compared to the TAB fragment capacity to implement the size test.

In some embodiments, the hardware accelerator may be configured to perform the size comparison on a given primitive by computing an area (e.g. 0.5*WIDTH*HEIGHT in the case of a triangle) of the primitive, adding a positive constant (referred to herein as the marginal adjustment constant) to the area, and comparing the marginally adjusted area to the fragment capacity of the TAB. The marginal adjustment constant accounts for the fact that the geometric area of a primitive may be smaller than the fragment size of the primitive (i.e. the number of fragments which intersect the primitive). The sum of the marginal adjustment constant and the geometric area gives an upper bound for the fragment size.

The texture layers are interpreted herein as including any information capable of modifying the color of primitive fragments (or the samples populating the primitive fragments). For example, some of the texture layers may be illumination maps.

The hardware accelerator may generate sample positions in the primitive fragments, identify which of the sample positions reside interior to the primitive, and compute a color vector for each interior sample based on color vectors associated with the primitive vertices. In applying the textures (from the multiple texture layers) to the primitive fragments, the hardware accelerator may compute texture values at fragment resolution and apply each texture value to the sample color vectors of the corresponding primitive fragment. As used herein the term "texture value" is to be interpreted broadly to mean any data value which may be used to modify the color (or other properties) of fragments and/or samples.

In one alternative set of embodiments, the hardware accelerator may generate samples after all or most of the texture layers have been applied to the intersecting fragments. An initial color vector may be computed for each intersecting fragment based on a spatial interpolation of color at the primitive vertices. The multiple textures may be cumulatively applied to the initial color vectors. When the samples are generated for the primitive fragments, the finally modified color vectors are applied (e.g. flat filled) to the samples.

The hardware accelerator stores the samples (after application of the multiple texture layers) in a sample area of the frame buffer, subsequently reads and filters the samples to obtain pixel values, and store the pixel values in a pixel area of the frame buffer. The video output processor reads the pixel values from the pixel area of the frame buffer and generates a portion of a video signal from the pixel values. The video signal may be provided to a video output port for display on a display device (e.g. a projector or monitor).

BRIEF DESCRIPTION OF THE DRAWINGS

The foregoing, as well as other objects, features, and advantages of this invention may be more completely understood by reference to the following detailed description when read together with the accompanying drawings in which.

Figure 1:
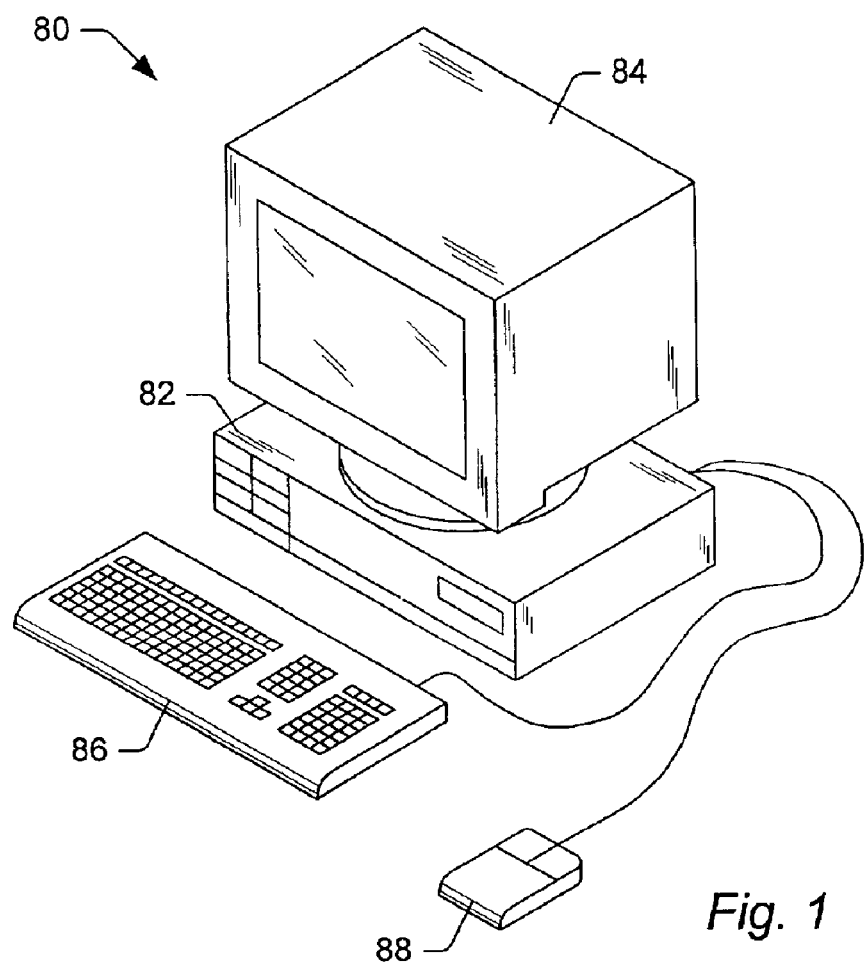
FIG. 1 illustrates one embodiment of a graphics system configured to perform 3D graphics computations for display of graphical object on a display device.

While the invention is susceptible to various modifications and alternative forms, specific embodiments thereof are shown by way of example in the drawings and will be described in detail herein. It should be understood, however, that the drawings and detailed description thereto are not intended to limit the invention to the particular forms disclosed, but on the contrary, the intention is to cover all modifications, equivalents, and alternatives falling within the spirit and scope of the present invention as defined by the appended claims. Please note that the headings are for organizational purposes only and are not meant to limit the description or claims. The word "may" is used in this application in a permissive sense (i.e., having the potential to, being able to), not a mandatory sense (i.e., must). Similarly, the word "include", and derivations thereof, are used herein to mean "including, but not limited to."

DETAILED DESCRIPTION OF SEVERAL EMBODIMENTS

Computer System—FIG. 1

Referring now to FIG. 1, one embodiment of a computer system 80 that includes a graphics system is shown. The graphics system may be comprised in any of various systems, including a computer system, network PC, Internet appliance, a television, including HDTV systems and interactive television systems, personal digital assistants (PDAs), virtual reality systems, and other devices which display 2D and or 3D graphics, among others.

As shown, the computer system 80 comprises a system unit 82 and a video monitor or display device 84 coupled to the system unit 82. The display device 84 may be any of various types of display monitors or devices (e.g., a CRT, LCD, or gas-plasma display). Various input devices may be connected to the computer system, including a keyboard 86 and/or a mouse 88, or other input device (e.g., a trackball, digitizer, tablet, six-degree of freedom input device, head tracker, eye tracker, data glove, or body sensors). Application software may be executed by the computer system 80 to display graphical objects on display device 84.

Figure 2:
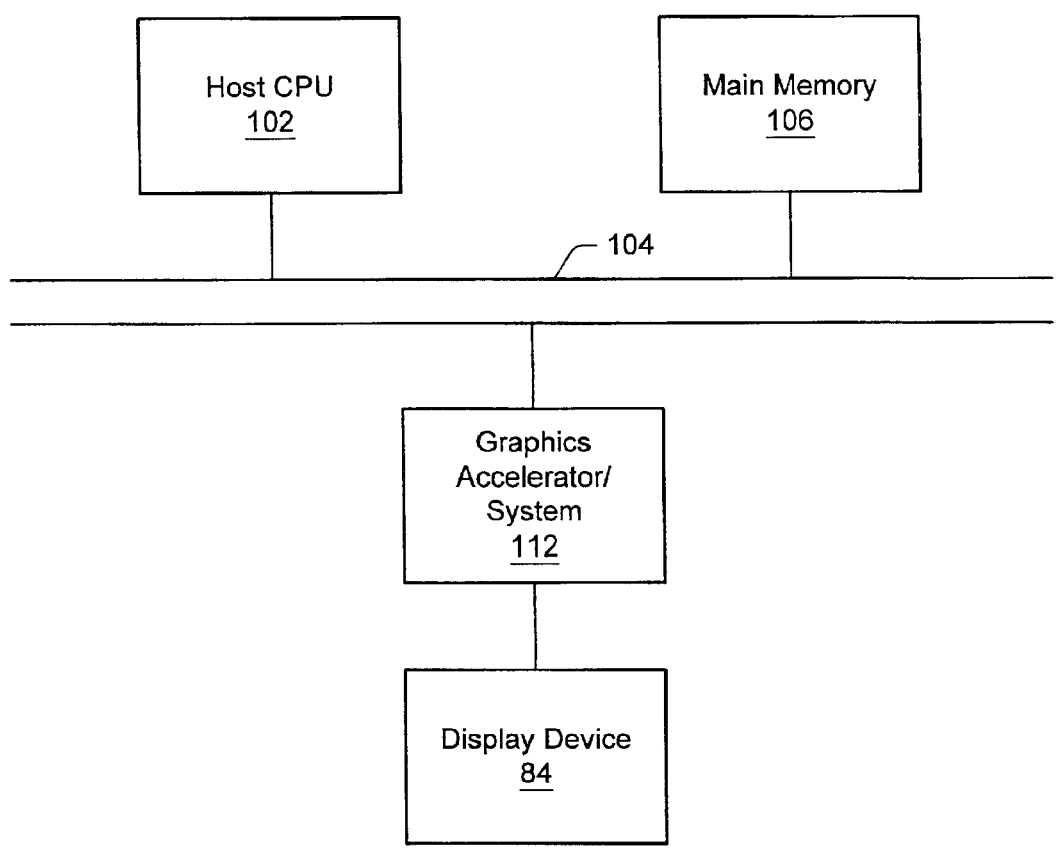
FIG. 2 is a block diagram for one embodiment of computer system 80.

Computer System Block Diagram—FIG. 2

Referring now to FIG. 2, a simplified block diagram illustrating the computer system of FIG. 1 is shown. Elements of the computer system that are not necessary for an understanding of the present invention are not shown for convenience. As shown, the computer system 80 includes a central processing unit (CPU) 102 coupled to a high-speed memory bus or system bus 104 also referred to as the host bus 104. A system memory 106 may also be coupled to high-speed bus 104.

Host processor 102 may comprise one or more processors of varying types, e.g., microprocessors, multi-processors and CPUs. The system memory 106 may comprise any combination of different types of memory subsystems, including random access memories, (e.g., static random access memories or "SRAMs," synchronous dynamic random access memories or "SDRAMs," and Rambus dynamic random access memories or "RDRAM," among others) and mass storage devices. The system bus or host bus 104 may comprise one or more communication or host computer buses (for communication between host processors, CPUs, and memory subsystems) as well as specialized subsystem buses.

In FIG. 2, a graphics system 112 is coupled to the high-speed memory bus 104. The 3-D graphics system 112 may be coupled to the bus 104 by, for example, a crossbar switch or other bus connectivity logic. It is assumed that various other peripheral devices, or other buses, may be connected to the high-speed memory bus 104. It is noted that the graphics system may be coupled to one or more of the buses in computer system 80 and/or may be coupled to various types of buses. In addition, the graphics system may be coupled to a communication port and thereby directly receive graphics data from an external source, e.g., the Internet or a network. As shown in the figure, one or more display devices 84 may be connected to the graphics system 112 comprised in the computer system 80.

Host CPU 102 may transfer information to and from the graphics system 112 according to a programmed input/output (I/O) protocol over host bus 104. Alternately, graphics system 112 may access the memory subsystem 106 according to a direct memory access (DMA) protocol or through intelligent bus mastering.

A graphics application program conforming to an application programming interface (API) such as OpenGL or Java 3D may execute on host CPU 102 and generate commands and data that define a geometric primitive (graphics data) such as a polygon for output on display device 84. As defined by the particular graphics interface used, these primitives may have separate color properties for the front and back surfaces. Host processor 102 may transfer this graphics data to memory subsystem 106. Thereafter, the host processor 102 may operate to transfer the graphics data to the graphics system 112 over the host bus 104. In another embodiment, the graphics system 112 may read in geometry data arrays over the host bus 104 using DMA access cycles. In yet another embodiment, the graphics system 112 may be coupled to the system memory 106 through a direct port, such as the Advanced Graphics Port (AGP) promulgated by Intel Corporation.

The graphics system may receive graphics data from any of various sources, including the host CPU 102 and/or the system memory 106, other memory, or from an external source such as a network, e.g., the Internet, or from a broadcast medium, e.g., television, or from other sources.

Note while graphics system 112 is depicted as part of computer system 80, graphics system 112 may also be configured as a stand-alone device (e.g., with its own built-in display). Graphics system 112 may also be configured as a single chip device or as part of a system-on-a-chip or a multi-chip module. Additionally, in some embodiments, certain elements of the illustrated graphics system 112 may be implemented in software.

Figure 3:
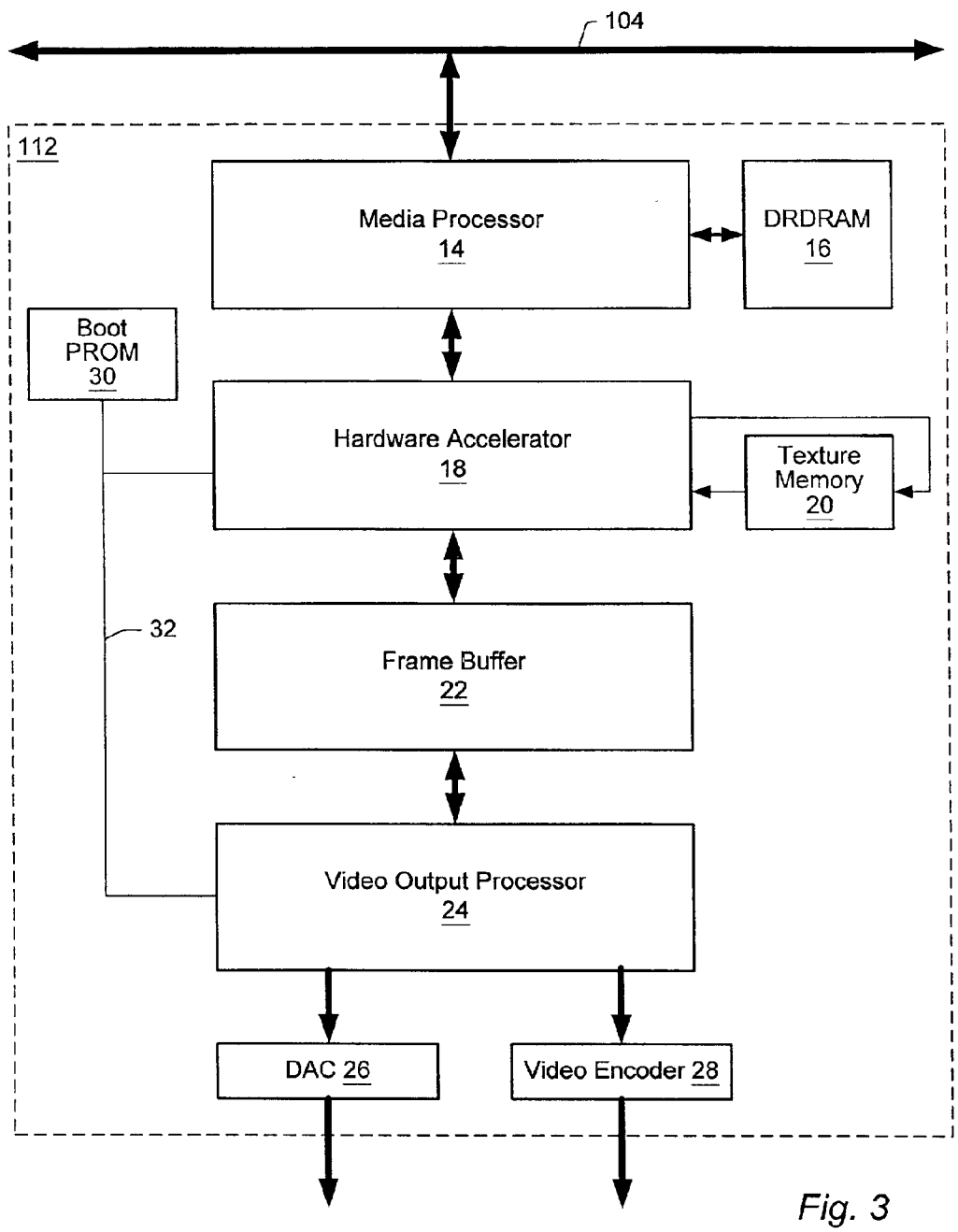
FIG. 3 is a block diagram for one embodiment of a graphics system configured to generate one or more video streams in response to received graphics data.

Graphics System—FIG. 3

Referring now to FIG. 3, a functional block diagram illustrating one embodiment of graphics system 112 is shown. Note that many other embodiments of graphics system 112 are possible and contemplated. Graphics system 112 may comprise one or more media processors 14, one or more hardware accelerators 18, one or more texture buffers 20, one or more frame buffers 22, and one or more video output processors 24. Graphics system 112 may also comprise one or more output devices such as digital-to-analog converters (DACs) 26, video encoders 28, flat-panel-display drivers (not shown), and/or video projectors (not shown). Media processor 14 and/or hardware accelerator 18 may be any suitable type of high performance processor (e.g., specialized graphics processors or calculation units, multimedia processors, DSPs, or general purpose processors).

In some embodiments, one or more of these components may be removed. For example, the texture buffer may not be included in an embodiment that does not provide texture mapping. In other embodiments, all or part of the functionality implemented in either or both of the media processor or the graphics accelerator may be implemented in software.

In some embodiments, media processor 14 and hardware accelerator 18 may be comprised within the same integrated circuit. In other embodiments, portions of media processor 14 and/or hardware accelerator 18 may be comprised within separate integrated circuits.

As shown, graphics system 112 may include an interface to a host bus such as host bus 104 in FIG. 2 to enable graphics system 112 to communicate with a host system such as computer system 80. More particularly, host bus 104 may allow a host processor to send commands to the graphics system 112. In one embodiment, host bus 104 may be a bi-directional bus.

Figure 4:
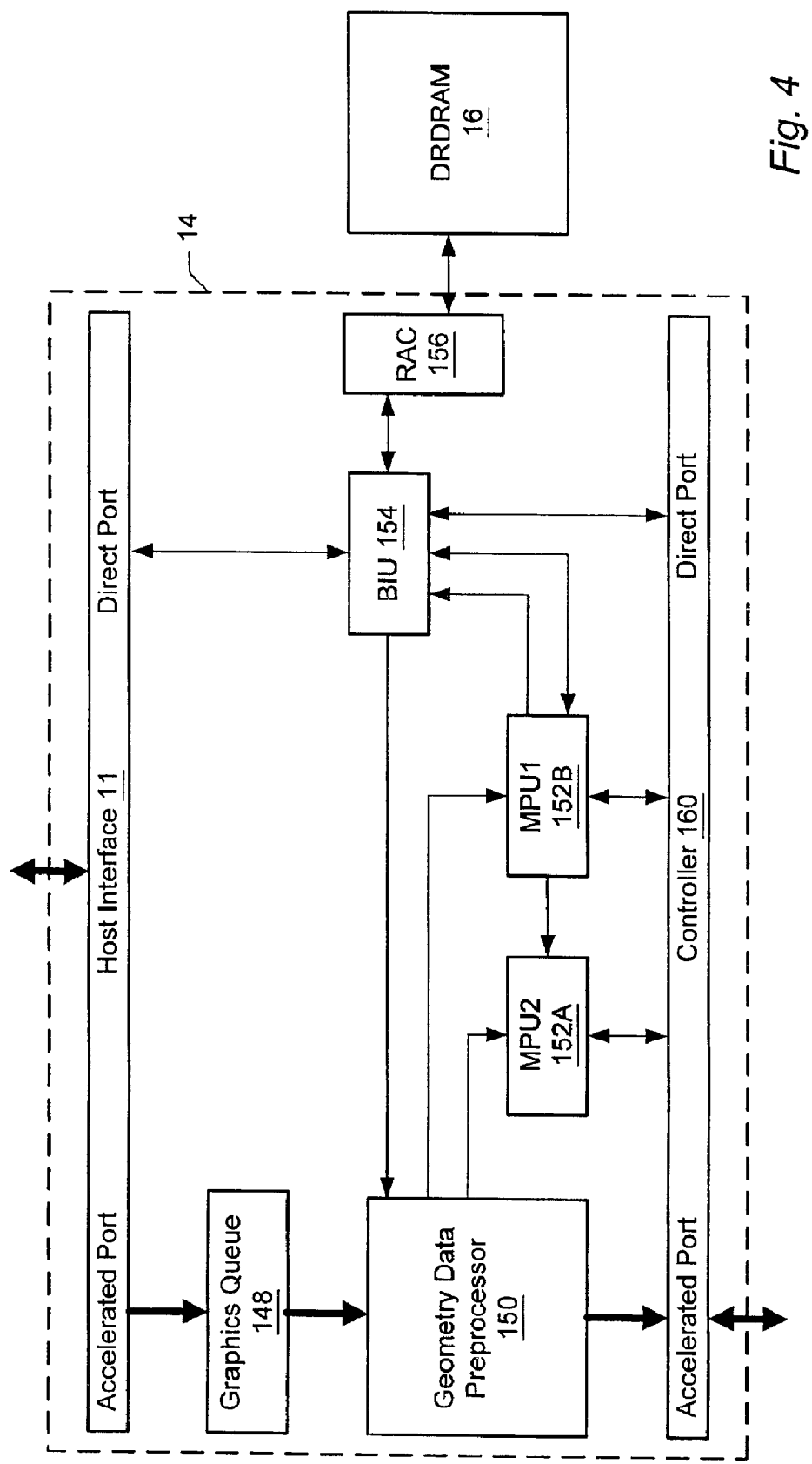
FIG. 4 is a block diagram for one embodiment of media processor 14.

Media Processor—FIG. 4

FIG. 4 shows one embodiment of media processor 14. As shown, media processor 14 operates as the interface between graphics system 112 and computer system 80 by controlling the transfer of data between graphics system 112 and computer system 80. In some embodiments, media processor 14 may also be configured to perform transform, lighting, and/or other general-purpose processing on graphical data.

Transformation refers to manipulating an object and includes translating the object (i.e., moving the object to a different location), scaling the object (i.e., stretching or shrinking), and rotating the object (e.g., in three-dimensional space, or "3-space").

Lighting refers to calculating the illumination of the objects within the displayed image to determine what color and or brightness each individual object will have. Depending upon the shading algorithm being used (e.g., constant, Gourand, or Phong), lighting may be evaluated at a number of different locations. For example, if constant shading is used (i.e., each pixel of a polygon has the same lighting), then the lighting need only be calculated once per polygon. If Gourand shading is used, then the lighting is calculated once per vertex. Phong shading calculates the lighting on a per-pixel basis.

As illustrated, media processor 14 may be configured to receive graphical data via host interface 11. A graphics queue 148 may be included in media processor 14 to buffer a stream of data received via the accelerated port of host interface 11. The received graphics data may comprise one or more graphics primitives. As used herein, the term graphics primitive may include polygons, parametric surfaces, splines, NURBS (non-uniform rational B-splines), sub-divisions surfaces, fractals, volume primitives, voxels (i.e., three-dimensional pixels), and particle systems. In one embodiment, media processor 14 may also include a geometry data preprocessor 150 and one or more microprocessor units (MPUs) 152. MPUs 152 may be configured to perform vertex transform and lighting calculations and programmable functions and to send results to hardware accelerator 18. MPUs 152 may also have read/write access to texels (i.e. the smallest addressable unit of a texture map, which is used to "wallpaper" a three-dimensional object) and pixels in the hardware accelerator 18. Geometry data preprocessor 150 may be configured to decompress geometry, to convert and format vertex data, to dispatch vertices and instructions to the MPUs 152, and to send vertex and attribute tags or register data to hardware accelerator 18.

As shown, media processor 14 may have other possible interfaces, including an interface to a memory. For example, as shown, media processor 14 may include direct Rambus interface 156 to a direct Rambus DRAM (DRDRAM) 16. A memory such as DRDRAM 16 may be used for program and data storage for MPUs 152. DRDRAM 16 may also be used to store display lists and/or vertex texture maps.

Media processor 14 may also include interfaces to other functional components of graphics system 112. For example, media processor 14 may have an interface to another specialized processor such as hardware accelerator 18. In the illustrated embodiment, controller 160 includes an accelerated port path that allows media processor 14 to control hardware accelerator 18. Media processor 14 may also include a direct interface, such as bus interface unit (BIU) 154, which provides a direct port path to memory 16 and to hardware accelerator 18 and video output processor 24 via controller 160.

Figure 5:
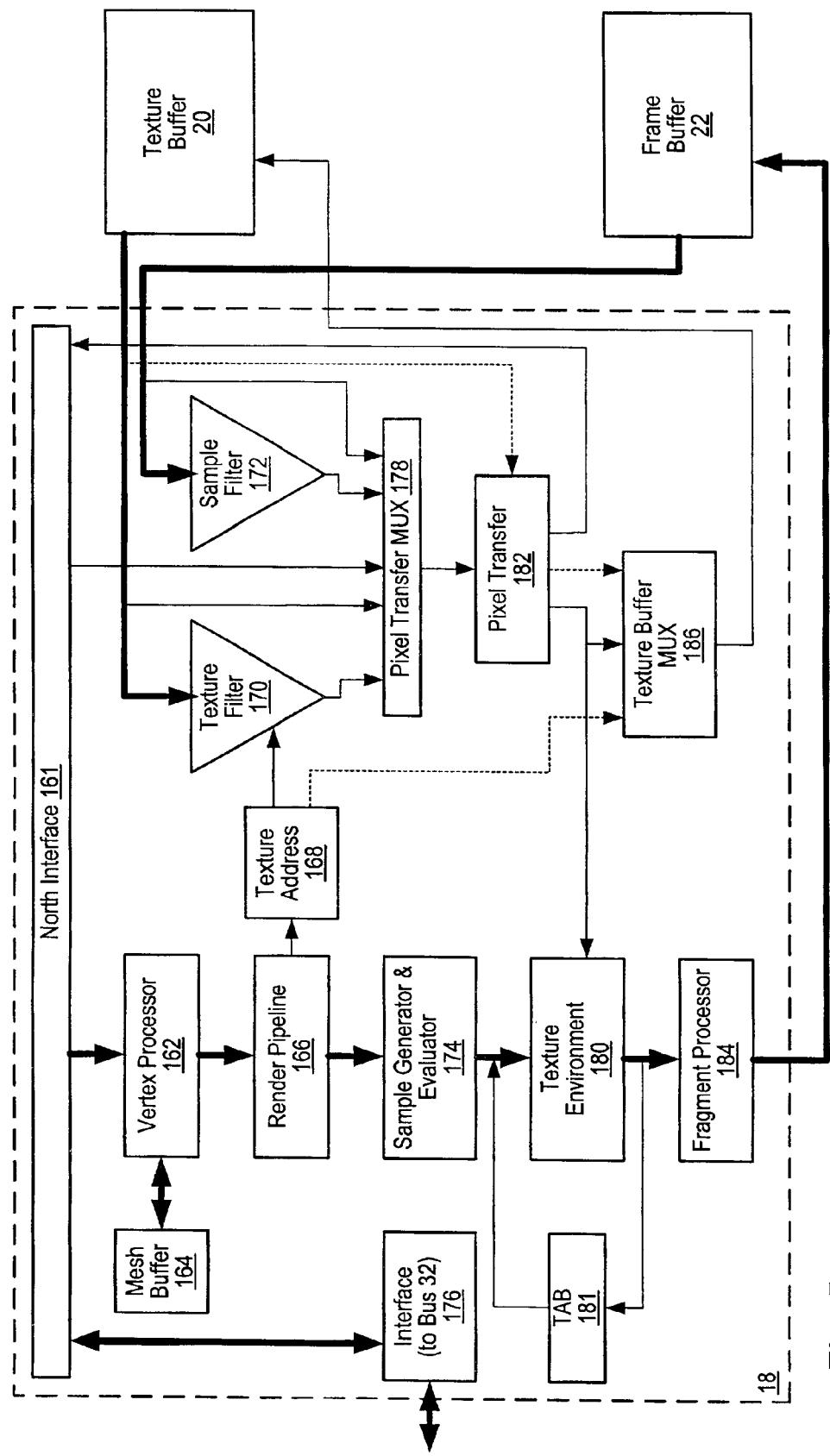
FIG. 5 is a block diagram for one embodiment of hardware accelerator 18.

Hardware Accelerator—FIG. 5

One or more hardware accelerators 18 may be configured to receive graphics instructions and data from media processor 14 and then to perform a number of functions on the received data according to the received instructions. For example, hardware accelerator 18 may be configured to perform rasterization, 2D or 3D texturing, pixel transfers, imaging, fragment processing, clipping, depth cueing, transparency processing, set-up, and/or screen space rendering of various graphics primitives occurring within the graphics data.

Clipping refers to the elimination of graphics primitives or portions of graphics primitives that lie outside of a 3D view volume in world space. The 3D view volume may represent that portion of world space that is visible to a virtual observer (or virtual camera) situated in world space. For example, the view volume may be a solid truncated pyramid generated by a 2D view window and a viewpoint located in world space. The solid truncated pyramid may be imagined as the union of all rays emanating from the viewpoint and passing through the view window. The viewpoint may represent the world space location of the virtual observer. In most cases, primitives or portions of primitives that lie outside the 3D view volume are not currently visible and may be eliminated from further processing. Primitives or portions of primitives that lie inside the 3D view volume are candidates for projection onto the 2D view window.

Set-up refers to mapping primitives to a three-dimensional viewport. This involves translating and transforming the objects from their original "world-coordinate" system to the established viewport's coordinates. This creates the correct perspective for three-dimensional objects displayed on the screen.

Screen-space rendering refers to the calculation performed to generate the data used to form each pixel that will be displayed. For example, hardware accelerator 18 may calculate "samples." Samples are points that have color information but no real area. Samples allow hardware accelerator 18 to "super-sample," or calculate more than one sample per pixel. Super-sampling may result in a higher quality image.

Hardware accelerator 18 may also include several interfaces. For example, in the illustrated embodiment, hardware accelerator 18 has four interfaces. Hardware accelerator 18 has an interface 161 (referred to as the "North Interface") to communicate with media processor 14. Hardware accelerator 18 may also be configured to receive commands from media processor 14 through this interface. Additionally, hardware accelerator 18 may include an interface 176 to bus 32. Bus 32 may connect hardware accelerator 18 to boot PROM 30 and/or video output processor 24. Boot PROM 30 may be configured to store system initialization data and/or control code for frame buffer 22. Hardware accelerator 18 may also include an interface to a texture memory 20. For example, hardware accelerator 18 may interface to texture memory 20 using an eight-way interleaved texel bus that allows hardware accelerator 18 to read from and write to texture memory 20. Hardware accelerator 18 may also interface to a frame buffer 22. For example, hardware accelerator 18 may be configured to read from and/or write to frame buffer 22 using a four-way interleaved pixel bus.

The vertex processor 162 may be configured to use the vertex tags received from the media processor 14 to perform ordered assembly of the vertex data from the MPUs 152. Vertices may be saved in and/or retrieved from a mesh buffer 164.

The render pipeline 166 may be configured to receive vertices and convert them to fragments. The render pipeline 166 may be configured to rasterize 2D window system primitives (e.g., dots, fonts, Bresenham lines, polygons, rectangles, fast fills, and BLITs (Bit Block Transfers, which move a rectangular block of bits from main memory into display memory, which may speed the display of moving objects on screen)) and 3D primitives (e.g., smooth and large dots, smooth and wide DDA (Digital Differential Analyzer) lines, triangles, polygons, and fast clear) into pixel fragments. The render pipeline 166 may be configured to handle full-screen size primitives, to calculate plane and edge slopes, and to interpolate data down to pixel tile resolution using interpolants or components such as r, g, b (i.e., red, green, and blue vertex color); r2, g2, b2 (i.e., red, green, and blue specular color from lit textures); a (alpha); and z, s, t, r, and w (texture components).

In embodiments using supersampling, the sample generator 174 may be configured to generate samples from the fragments output by the render pipeline 166 and to determine which samples are inside the rasterization edge. Sample positions may be defined in loadable tables to enable stochastic sampling patterns.

Hardware accelerator 18 may be configured to write textured fragments from 3D primitives to frame buffer 22. The render pipeline 166 may send pixel tiles defining r, s, t and w to the texture address unit 168. The texture address unit 168 may determine the set of neighboring texels that are addressed by the fragment(s), as well as the interpolation coefficients for the texture filter, and write texels to the texture memory 20. The texture memory 20 may be interleaved to obtain as many neighboring texels as possible in each clock. The texture filter 170 may perform bilinear, trilinear or quadlinear interpolation. The pixel transfer unit 182 may also scale and bias and/or lookup texels. The texture environment 180 may apply texels to samples produced by the sample generator 174. The texture environment 180 may also be used to perform geometric transformations on images (e.g., bilinear scale, rotate, flip) as well as to perform other image filtering operations on texture buffer image data (e.g., bicubic scale and convolutions).

In the illustrated embodiment, the pixel transfer MUX 178 controls the input to the pixel transfer unit 182. The pixel transfer unit 182 may selectively unpack pixel data received via north interface 161, select channels from either the frame buffer 22 or the texture memory 20, or select data received from the texture filter 170 or sample filter 172.

The pixel transfer unit 182 may be used to perform scale, bias, and/or color matrix operations, color lookup operations, histogram operations, accumulation operations, normalization operations, and/or min/max functions. Depending on the source of and operations performed on the processed data, the pixel transfer unit 182 may then output the data to the texture memory 20 (via the texture buffer MUX 186), the frame buffer 22 (via the texture environment unit 180 and the fragment processor 184), or to the host (via north interface 161). For example, in one embodiment, when the pixel transfer unit 182 receives pixel data from the host via the pixel transfer MUX 178, the pixel transfer unit 182 may be used to perform a scale and bias or color matrix operation, followed by a color lookup or histogram operation, followed by a min/max function. The pixel transfer unit 182 may then output data to either the texture memory 20 or the frame buffer 22.

Fragment processor 184 may be used to perform standard fragment processing operations such as the OpenGL fragment processing operations. For example, the fragment processor 184 may be configured to perform the following operations: fog, area pattern, scissor, alpha/color test, ownership test (WID), stencil test, depth test, alpha blends or logic ops (ROP), plane masking, buffer selection, pick hit/occlusion detection, and/or auxiliary clipping in order to accelerate overlapping windows.

Texture Memory 20

Texture memory 20 may include several SDRAMs. Texture memory 20 may be configured to store texture maps and image processing buffers for hardware accelerator 18. Texture memory 20 may have many different capacities (e.g., depending on the type of SDRAM included in texture memory 20). In some embodiments, each pair of SDRAMs may be independently row and column addressable.

Frame Buffer 22

Graphics system 112 may also include a frame buffer 22. In one embodiment, frame buffer 22 may include multiple 3DRAM64s. Frame buffer 22 may be configured as a display pixel buffer, an offscreen pixel buffer, and/or a supersample buffer. Furthermore, in one embodiment, certain portions of frame buffer 22 may be used as a display pixel buffer, while other portions may be used as an offscreen pixel buffer and supersample buffer.

Figure 6:
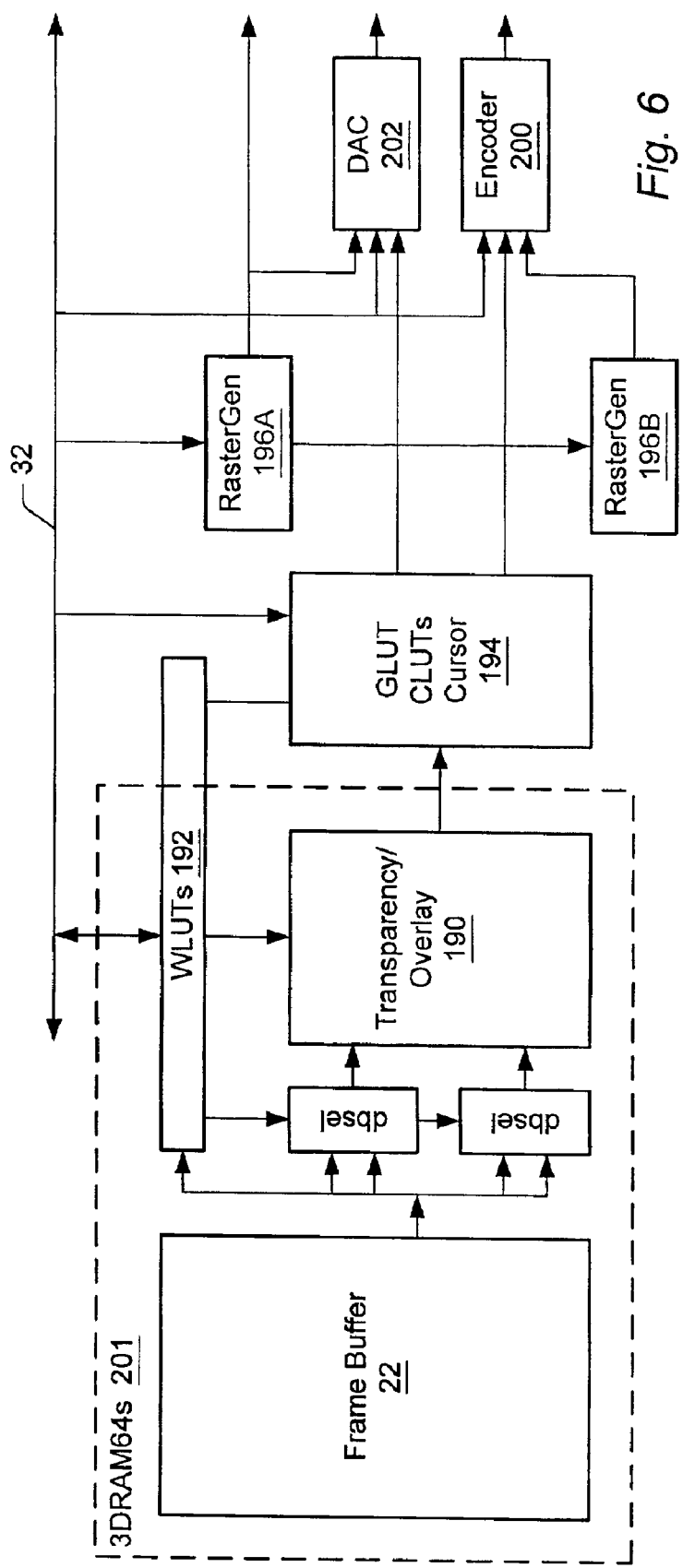
FIG. 6 is a block diagram for one embodiment of video output processor 24.

Video Output Processor—FIG. 6

A video output processor 24 may also be included within graphics system 112. Video output processor 24 may buffer and process pixels output from frame buffer 22. For example, video output processor 24 may be configured to read bursts of pixels from frame buffer 22. Video output processor 24 may also be configured to perform double buffer selection (dbsel) if the frame buffer 22 is double-buffered, overlay transparency (using transparency/overlay unit 190), plane group extraction, gamma correction, psuedocolor or color lookup or bypass, and/or cursor generation. For example, in the illustrated embodiment, the output processor 24 includes WID (Window ID) lookup tables (WLUTs) 192 and gamma and color map lookup tables (GLUTs, CLUTs) 194. In one embodiment, frame buffer 22 may include multiple 3DRAM64s 201 that include the transparency overlay 190 and all or some of the WLUTs 192. Video output processor 24 may also be configured to support two video output streams to two displays using the two independent video raster timing generators 196. For example, one raster (e.g., 196A) may drive a 1280×1024 CRT while the other (e.g., 196B) may drive a NTSC or PAL device with encoded television video.

DAC 202 may operate as the final output stage of graphics system 112. The DAC 202 translates the digital pixel data received from GLUT/CLUTs/Cursor unit 194 into analog video signals that are then sent to a display device. In one embodiment, DAC 202 may be bypassed or omitted completely in order to output digital pixel data in lieu of analog video signals. This may be useful when a display device is based on a digital technology (e.g., an LCD-type display or a digital micro-mirror display).

DAC 202 may be a red-green-blue digital-to-analog converter configured to provide an analog video output to a display device such as a cathode ray tube (CRT) monitor. In one embodiment, RGB DAC 202 may be configured to provide a high resolution RGB analog video output at dot rates of 240 MHz. Similarly, encoder 200 may be configured to supply an encoded video signal to a display. For example, encoder 200 may provide encoded NTSC or PAL video to an S-Video or composite video television monitor or recording device.

In other embodiments, the video output processor 24 may output pixel data to other combinations of displays. For example, by outputting pixel data to two DACs 202 (instead of one DAC 202 and one encoder 200), video output processor 24 may drive two CRTs. Alternately, by using two encoders 200, video output processor 24 may supply appropriate video input to two television monitors. Generally, many different combinations of display devices may be supported by supplying the proper output device and/or converter for that display device.

Overall Processing Flow

Hardware accelerator 18 receives vertices defining triangles from media processor 14, and renders the triangles in terms of samples. The samples are stored in a sample area of frame buffer 22. The samples are then read from the sample area of frame buffer 22 and filtered by sample filter 22 to generate pixels. The pixels are stored in a pixel area of frame buffer 22. The pixel area may be double buffered. Video output processor 24 reads pixels from the pixel area of frame buffer 22 and generate a video signal from the pixels. The video signal is made available to one or more display devices (e.g. monitors and/or projectors).

Figure 7:
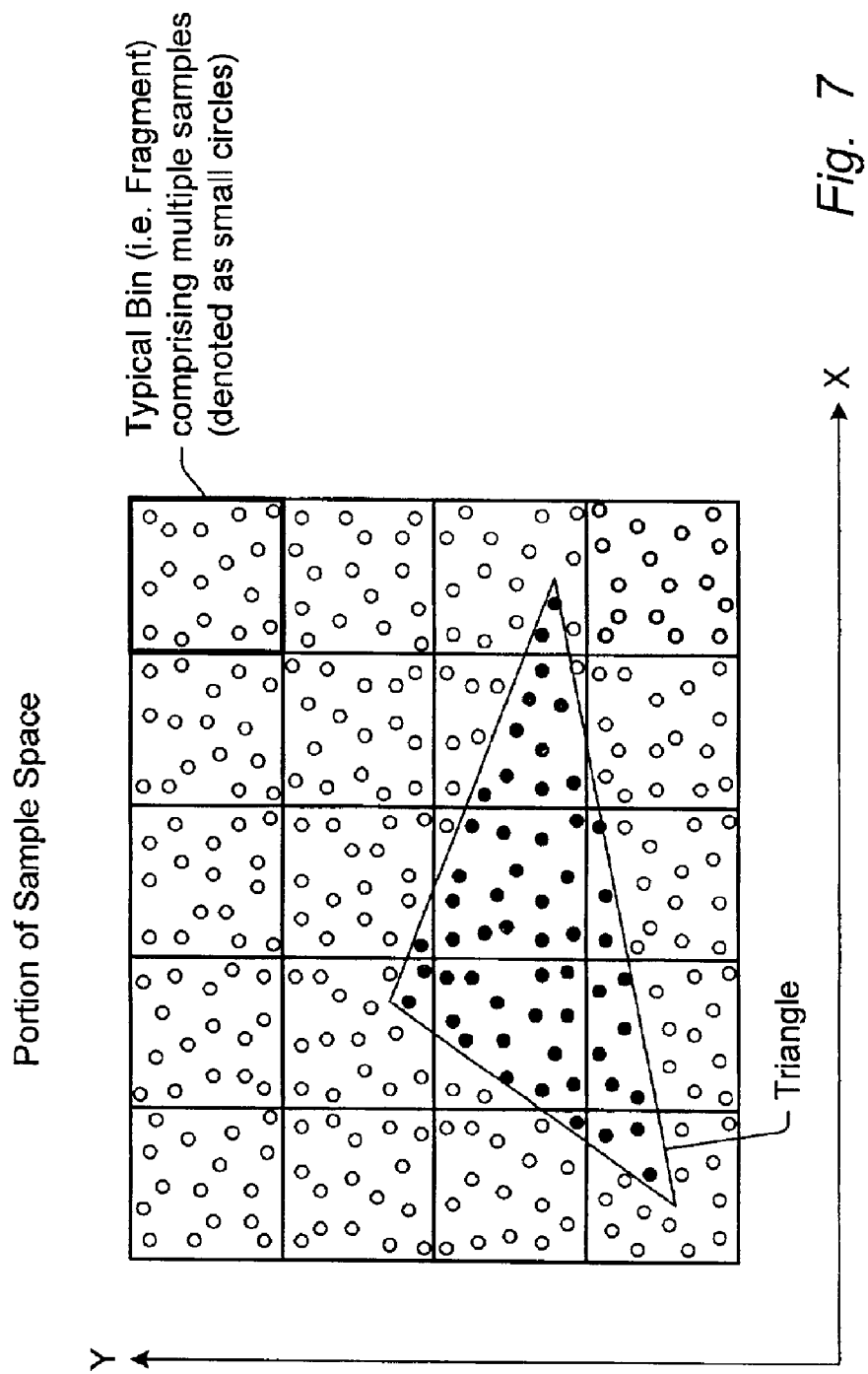
FIG. 7 illustrates a portion of rendering space populated with samples and partitioned into fragments (i.e. bins) according to one set of embodiments.

The samples are computed at positions in a two-dimensional sample space (also referred to as rendering space). The sample space is partitioned into an array of bins (also referred to herein as fragments). The storage of samples in the sample area of frame buffer 22 is organized according to bins (e.g. bin 300) as illustrated in FIG. 7. Each bin contains one or more samples. The number of samples per bin may be a programmable parameter.

Texture Pipe and Multitexturing Support

As shown in FIG. 5, in one embodiment, the texture pipe includes texture address unit 168, texture filter 170, texture environment 180 and texture accumulation buffer (TAB) 181. In addition, pixel transfer MUX 178 and pixel transfer unit 182 participate in texture processing operations.

The texture pipe is configured to apply multiple layers of texture to triangles. The multiple layers of texture are stored in texture memory 20. Each layer may comprise multiple mipmap levels. Let N be the number of texture layers stored in texture memory 20.

Render pipe 166 receives vertices defining a current triangle from vertex processor 162. Render pipe 166 determines a set of fragments (i.e. bins) which intersect the current triangle. For each intersecting fragment $F_j$, render pipe 166:

(a) sends the fragment $F_j$ to sample generator and evaluator 174 for sample processing; and (b) sends a request to the texture pipe for a layer-zero texture value $T0_j$ corresponding to fragment $F_j$.

In response to receiving the fragment $F_j$, sample generator and evaluator 174:

(1) populates the fragment $F_j$ with sample positions $S_{jk}$;
(2) determines which of the sample positions $S_{jk}$ reside interior to the current triangle;
(3) computes an initial color vector $C0_{jk}$ for each sample position $S_{jk}$ interior to the current triangle; and
(4) forwards the fragment $F_j$ including the sample color vectors $C0_{jk}$ corresponding to interior sample positions to texture environment 180. The index j corresponds to fragments. The index k corresponds to samples. The index pair jk corresponds to a sample within a fragment.

In response to request (b), the texture pipe accesses the layer-zero texture map of texture memory 20 to obtain layer-zero texels, and performs bilinear (or trilinear) filtering to generate the layer-zero texture value $T0_j$.

Texture address unit 168 receives the fragment address of fragment $F_j$ from render pipe 166, and generates read addresses (in the address space of texture memory 20) for the layer-zero texels which contribute to the computation of layer-zero texture value $T0_j$.

Texture filter 170 uses the read addresses to access the layer-zero texels and performs the bilinear (or trilinear) filtering on the layer-zero texels to generate the layer-zero texture value $T0_j$. The layer-zero texture value $T0_j$ is then fed through pixel transfer MUX 178 and pixel transfer unit 182 to texture environment 180.

Texture environment 180 receives the initial color vectors $C0_{jk}$ for each interior sample position in the fragment $F_j$ and the layer-zero texture value $T0_j$, applies the layer-zero texture value $T0_j$ to the initial color vector $C0_{jk}$ of each interior sample position $S_{jk}$ to generate resultant color vectors $R0_{jk}$. The resultant color vectors $R0_{jk}$ for the interior samples of fragment $F_j$ are stored in TAB 181.

Any of a variety of mathematical algorithms (including conventional algorithms) may be used by texture environment 180 to apply the texture values to the initial color vectors. Texture environment 180 may be programmable to employ different texturing algorithms at different times. Alternatively, texture environment 180 may employ an algorithm with fixed mathematical structure but modifiable parameters. In one embodiment, texture environment 180 may comprise dedicated circuitry for implementing one or more texturing algorithms.

In one set of embodiments, the initial color vector $C0_{jk}$ contains a transparency value in addition to red, green and blue color values (e.g. diffuse color values). Other per-sample attributes may be included as well.

Texture pipe and rendering pipe process all the intersecting fragments $F_j$ (i.e. all the fragments $F_j$ which intersect the current triangle) with respect to texture layer zero before proceeding to texture layer one. This is illustrated by the following pseudo-code fragment.

For each intersecting fragment $F_j$:
  Render pipe generates initial color vector $C0_{jk}$ for each interior sample $S_{jk}$;
  Texture pipe generates layer-zero texture value $T0_j$;
  Texture environment applies $T0_j$ to each of the initial color vectors $C0_{jk}$ to obtain resultant sample color vectors $R0_{jk}$;
  Texture environment stores vectors $R0_{jk}$ in TAB 180.

The initial color vectors $C0_{jk}$ may be computed based on a spatial interpolation of the color vectors associated with the triangle vertices.

After processing all the intersecting fragments $F_j$ with respect to layer zero, the texture pipe processes all the intersecting fragments $F_j$ with respect to texture layer one as follows. For each intersecting fragment $F_j$, the texture pipe generates a corresponding layer-one texture value $T1_j$ by accessing and filtering appropriate texels from texture layer one of texture memory 20. Texture environment 180 reads sample color vectors $R0_{jk}$ corresponding to fragment $F_j$ from TAB 181 and applies the layer-one texture value $T1_j$ to each of the sample color vectors $R0_{jk}$, thereby generating resultant sample color vectors $R1_{jk}$. Each sample of the fragment $F_j$ includes a valid bit indicating whether it resides interior or exterior to the current triangle. Only the color vectors $R0_{jk}$ of samples interior to the current triangle need be modified with the texture value. Texture environment 180 stores the resultant sample color vectors $R1_{jk}$ for fragment $F_j$ into TAB 181. In the preferred embodiment, texture environment 180 overwrites fragment $F_j$ in TAB 181 with the update color information, i.e. overwrites the color vectors $R0_{jk}$ with the updated color vectors $R1_{jk}$.

Texture layers two through N-1 are applied in same fashion as layer one as illustrated by the following pseudo-code fragment. Let I be any integer in the range 1, 2, . . . , N-1.

For each fragment $F_j$:
  Texture pipe generates layer I texture value $TI_j$ by accessing and filtering appropriate texels from layer I of texture memory 20;
  Texture environment reads fragment $F_j$ from TAB 181;
  Texture environment applies texture value $TI_j$ to sample color vectors $R(I-1)_{jk}$ comprised within fragment $F_j$ and corresponding to interior samples to obtain resultant sample color vectors $RI_{jk}$;
  Texture environment stores resultant sample color vectors $RI_{jk}$ in TAB 181.

Thus, layer zero texture is applied to sample colors received from sample generator and evaluation unit, whereas layers one though N-1 are applied to sample colors received from TAB 181.

In the application of the last texture layer N-1, texture environment 180 may store the final sample color vectors $RN_{jk}$ into TAB 181 and send pointers to the fragments $F_j$ to fragment processor 184 (i.e. pointers in the TAB address space). Fragment processor 184 may forward the fragments (including the final sample color value vectors $R(N-1)_{jk}$ to the sample area of frame buffer. Alternatively, texture environment 180 may send the final sample color vectors $R(N-1)_{jk}$ directly to fragment processor 184 and thus storage of final sample color vectors $R(N-1)_{jk}$ may be avoided.

In general, texture pipe processes all the intersecting fragments $F_j$ (i.e. all the fragments $F_j$ which intersect the current triangle) with respect to texture layer I before proceeding to texture layer (I+1), where I takes any of the values 0, 1, 2, . . . , (N-2). This strategy is significantly more efficient that the conventional strategy of processing all texture layers against fragment $F_j$ before proceeding to the next fragment $F_{j+1}$. Because the processing of successive texture layers is the inner loop, the conventional strategy very frequently makes large magnitude jumps in the address space texture memory 20. Thus, the rate of page misses (and cache misses in those embodiments that have a texture cache) in accesses to texture memory 20 is high.

In contrast, the herein disclosed strategy of processing fragments as the inner loop and texture layers as the outer loop significantly reduces thrashing of texture memory 20. The large magnitude address jump between texture layers may advantageously occur less often. The successive fragments within a texture layer induce relatively small address jumps in the texture memory address space because the fragments are all spatially localized (to a single triangle).

Thus, there may be a significantly decreased probability of encountering page misses and cache misses.

It is noted that the processing methodology described in the embodiments above may be used for effects other than traditional texturing. For example, one of the texture layers may be interpreted as an illumination map which modulates the intensity of rendered samples and/or fragments. Thus, the texture layers stored in texture memory 20 should be broadly interpreted to include any of various types of image information capable of modifying pixel or sample colors.

In one set of embodiments, hardware accelerator 18 is an application specific integrated circuit (ASIC) which is optimized for the sample and texture processing operations described herein. TAB 181 may be implemented as on-chip SRAM.

Multitexturing with Deferred Sample Generation

In a second set of embodiments, texture layers are applied to the current triangle at fragment resolution, stored in TAB 181 at fragment resolution, and samples are generated for fragments only after the penultimate texture layer (i.e. layer N-2) has completed.

Render pipe 166 initially generates a single color vector $C0_j$ for each fragment $F_j$ that intersects the current triangle. Thus, color vector $C0_j$ may be referred to as a fragment color vector. Texture environment 180 receives the layer zero texture value $T0_j$ corresponding to each intersecting fragment $F_j$ from pixel transfer unit 182, and applies the layer zero texture value $T0_j$ to the corresponding fragment color vector $C0_j$. The resulting fragment color vector $R0_j$ is stored into TAB 181.

When all the fragments $F_j$ intersecting the current triangle have been processed with respect to layer zero, texture environment 180 processes layer one as follows. Texture environment 180 receives the layer-one texture value $T1_j$ corresponding to each intersecting fragment $F_j$ from pixel transfer unit 182, reads the fragment color vector $R0_j$ corresponding to fragment $F_j$ from TAB 181, and applies the layer-one texture $T1_j$ to fragment color vector $R0_j$ to generate resultant fragment color vector $R1_j$. The resultant fragment color vector $R1_j$ is stored into TAB 181.

Texture layers two through (N-2) are processed in a similar fashion to layer one. Let I be any integer in the range two through N-2. For each intersecting fragment $F_j$, texture environment 180 reads the fragment color vector $R(I-1)_j$, receives the layer I texture value $TI_j$ corresponding to fragment $F_j$ from pixel transfer unit 182, and applies the texture value $TI_j$ to the fragment color vector $R(I-1)j$ to generate a resultant fragment color vector $RI_j$. The resultant fragment color vector $RI_j$ is stored into TAB 181. All fragments $F_j$ intersecting the current triangle are processed with respect to layer I before proceeding to layer (I+1).

The last texture layer (i.e. layer N-1) is processed as follows. For each intersecting fragment $F_j$, sample generation and evaluation unit 174:

(1) populates the fragment $F_j$ with samples positions $S_{jk}$;
(2) determines which of the sample positions $S_{jk}$ reside interior to the current triangle, and sets a valid flag to indicate the interior or exterior status of each sample $S_{jk}$;
(3) computes z coordinate values for each sample position $S_{jk}$ based on a spatial interpolation of z values at the vertices of the current triangle; and
(4) forwards the fragment $F_j$ including the sample positions $S_{jk}$ and corresponding z values and valid flags to texture environment 180.

Texture environment 180 reads the fragment color vector $R(N-2)_j$ corresponding to fragment $F_j$ from TAB 181, receives layer (N-1) texture value $T(N-1)_j$ from pixel transfer unit 182, and applies the texture value $T(N-1)_j$ to fragment color vector $R(N-2)_j$ to obtain a resultant fragment color vector $R(N-1)_j$. The resultant fragment color vector $R(N-1)_j$ may then be assigned to all the interior samples of fragment $F_j$, i.e. to all sample positions $S_{jk}$ which reside interior to fragment $F_j$. The fragment $F_j$ (now including the final sample color vectors of the interior samples) may be forwarded to fragment processor 184. Fragment processor 184 may store the fragment 184 in a sample area of frame buffer 22. Frame buffer 22 uses the z values of the samples in the fragment $F_j$ to perform z buffering.

In a first set of embodiments described above, color is initially interpolated to sample resolution, and color is updated and stored in TAB 181 at sample resolution, although texture values are computed only at fragment resolution. In a second set of embodiments, color is initially interpolated to fragment resolution, and color is updated and stored in TAB at fragment resolution until the last texture layer is to be applied. At this last stage, samples are generated, the last texture layer is applied at the fragment level, the final texturized color is assigned to all valid samples in the fragment.

In many situations, color does not change significantly for the samples within a given fragment. In these situations, the second set of embodiments of graphics system may generate video output whose visual quality is indistinguishable or negligibly different from the first set of embodiments.

Size Estimation for Graphics Primitives

As described above, graphics system 112 may be configured to apply multiple texture layers to a graphics primitive (such as a triangle, dot, line or polygon). Render pipe 166 identifies a collection of fragments that intersect a current primitive, and the texture pipe (including texture environment 180) applies the multiple layers of texture to the intersecting fragments or samples within the intersecting fragments. Texture environment 180 stores fragment or sample color information for the intersecting fragments in TAB 181 between the application of successive texture layers.

The storage capacity (i.e. size) of TAB 181 implies a limit on the size of primitives processed by the texture pipe. To prevent overflow of TAB 181, a primitive sent down to the render pipe 166 and the texture pipe should intersect a number of fragments which is less than or equal to the fragment capacity of TAB 181.

In some embodiments, TAB 181 may store multiple samples per fragment. In these embodiments, TAB 181 has a fragment capacity and a sample capacity. The sample capacity is equal to the fragment capacity times the number of samples allocated per fragment. In other embodiments, TAB 181 stores color information for fragments and not for samples. For example, TAB 181 may store a single RGB color vector per fragment.

In one embodiment, the capacity of TAB 181 is equal to 1024 entries, each entry occupying a predetermined number of bits. An entry may store color information for a fragment or for a sample within a fragment. More generally, TAB 181 may have any desired storage capacity subject to the fundamental limitations of cost, die area, complexity, etc. Powers of two are favored for the TAB capacity.

If a primitive is so large that it intersects more fragments than the TAB can store, it is subdivided into smaller primitives that individually are small enough to fit within the TAB. In one set of embodiments, vertex processor 162 receives vertices (or geometric parameters) defining primitives, estimates the size of the graphics primitives, compares the size estimates to the TAB fragment capacity, and conditionally performs the subdivision of primitives depending on the result of the size comparison. Thus, vertex processor 162 sends down to render pipe 166 only primitives that are "size appropriate", i.e. primitives that are guaranteed to intersect a number of fragments that is less than or equal to the fragment capacity of TAB 181.

The size estimation may be conservative, i.e. a value may be reported which is larger than the actual number of fragments hit by the current primitive. If the size estimate for a given primitive is larger than the TAB fragment capacity, vertex processor 162 subdivides the primitive into subprimitives whose sizes are smaller than the TAB fragment capacity, and sends the subprimitives down to the render pipe 166. The union of the subprimitives (interpreted as subsets of the two-dimensional rendering space) equal the original primitive. If the size estimate for the primitive is less than or equal to the TAB fragment capacity, vertex processor 162 may send the primitive down to render pipe 166 without subdivision.

In one set of embodiments, vertex processor 162 may send down multiple versions of a primitive to render pipe 166, i.e. as many versions as texture layers which are to be applied to the primitive. Each version may contain the same vertex color and vertex positions but designates a different one of the texture layers and contains texture coordinate data corresponding to the designated texture layer. Thus, in this set of embodiments, the subsequent rasterization hardware (downstream from vertex processor 162) only needs to be able to process a primitive with respect to one designated texture layer. The fragments or samples for each layer are accumulated in TAB 181 until the final layer is processed. After the final layer is processed, the rendered samples may be forwarded to the sample area of frame buffer 22, and the vertex processor 162 may initiate rasterization of the next primitive (e.g. by sending down multiple versions of the next primitive to render pipe 166).

As mentioned above, vertex processor 162 may generate a conservative size estimate for each received primitive. Vertex processor 162 may implement any of a variety of size estimates. Typically the computational effort for a size estimate depends on the accuracy attained by the estimate. In other words, it is computationally more expensive to obtain a size estimate which stays close to the actual size of the primitive than an estimate which reports a generous upper bound for the actual size. Accurate estimates typically require more complex arithmetic hardware—more multipliers, adders and subtractors. Thus, the size estimate employed by vertex processor 162 may depend on the time budget (e.g. the number of clock cycles allowed for the size estimate computation and the amount of die area allocated for the size estimate circuitry. The actual size of a primitive may be defined as the number of fragments which geometrically intersect with the primitive. For example, in FIG. 7, eleven fragments geometrically intersect with the given triangle. Thus, the actual size of the triangle is 11.

A perfectly accurate size estimate may be desirable but expensive to implement in hardware. In contrast, an estimate that reports too generous an upper bound for the actual size may induce a large number of unnecessary subdivisions per unit time. This results from the estimate reporting size values for primitives which are larger than the TAB fragment capacity when in fact the actual sizes of the primitives are smaller than the TAB fragment capacity.

The texture pipe operates with increasing efficiency as the actual size of primitives increases up to the TAB fragment capacity. Successive read accesses to texture memory 20 which involve small address jumps are more likely to hit the same memory page and to hit in the texture cache (if a texture cache is implemented) than read accesses which involve large address jumps. Recall that the texture pipe makes relatively small address jumps to access successive texels (or groups of texels) for a given primitive within a texture layer and relatively large address jumps to access successive texels from distinct texture layers. Furthermore, the texture pipe completely processes the successive fragments of a primitive with respect to one layer before proceeding to the next. Thus, when processing large primitives, the texture pipe spends a larger fraction of its time making the small address jumps and a smaller fraction of its time making the large address jumps than when processing small primitives. This implies that large primitives (provided they fit within TAB 181) are handled more efficiently than small primitives. The unnecessary triangle subdivisions induced by an inaccurate size estimate represent a lost opportunity to benefit from the size-related efficiency gain of the texture pipe.

Thus, while accuracy of a size estimate is desirable it may need to be balanced with issues such as implementation cost. Different tradeoffs are contemplated for different target markets.

Much of the following discussion focuses on size estimation for triangles. However, the size estimation methodologies disclosed herein naturally generalize to other primitives such as quadrilaterals, lines and dots.

In one set of embodiments, vertex processor 162 may generate the size estimate for a current triangle as follows. Vertex processor 162 may compute the coordinates for the axis-aligned bounding box that minimally contains the current triangle. The term "axis-aligned" means that the bounding box has sides parallel to the coordinate axes of sample space. The coordinates of the minimal bounding box may be computed by determining the minimum and maximum of the horizontal and vertical coordinates of the triangle vertices:

$$X_{min}=\min\{X_1,X_2,X_3\}$$

$$X_{max}=\max\{X_1,X_2,X_3\}$$

$$Y_{min}=\min\{Y_1,Y_2,Y_3\}$$

$$Y_{max}=\max\{Y_1,Y_2,Y_3\},$$

where $(X_i,Y_i)$ defines the $i^{th}$ triangle vertex.

Furthermore, vertex processor 162 may compute a width W and height H for the minimal bounding box according to the relations $$W=X_{max}-X_{min}$$

$$H=Y_{max}-Y_{min}.$$

The area of the triangle is (½)WH. Under the assumption that each fragment is a one-by-one square in sample space with edges having integer coordinates, a generic triangle may intersect a number of fragments which is significantly larger than its area (½)WH. For example, a right triangle with vertices at (0,0), (0,10) and (10,10) intersects 55 fragments instead of 50=(½)(10)(10) fragments. In one set of embodiments, this discrepancy is accounted for by computing an estimate E for the area (½)WH, adding a positive integer constant $C_{margin}$ to the estimate E, and comparing the sum $E+C_{margin}$ to the TAB fragment capacity. The value of $C_{margin}$ may be chosen to be an upper bound for the discrepancy between the actual number of intersecting fragments and the triangle area for all possible triangles with actual number less than or equal to the TAB fragment capacity. The value $C_{margin}$ may be supplied by a user, system operator, system designer, etc.

In another set of embodiments, the values of W and H are increased by additive constants so that the new triangle area $(½)(W+\Delta W)(H+\Delta H)$ is guaranteed to be greater than or equal to the number of intersecting fragments. Thus, vertex processor 162 may perform width and height adjustment according to the relations $$W=W+\Delta W$$

$$H=H+\Delta H,$$

where $\Delta W$ and $\Delta H$ are positive constants, and generate an estimate E for the new triangle area $(½)WH$, and compare the estimate E directly to the TAB fragment capacity.

In some embodiments, vertex processor 162 may implement the size comparison based on the following analysis. Let W and H be represented as binary words. Let $\alpha$ be the bit position of the leading one in the binary representation of W. The leading one is the one bit that occur closest to the most significant bit position in the representation of W. Bit position are counted starting from zero at the least significant bit and increase with each successively more significant bit. The following table gives several examples.

| W | $\alpha$ |
|---|---|
| 00110101 | 5 |
| 00000110 | 2 |
| 10001011 | 7 |
| 00000001 | 0 |

The table gives examples for eight-bit words. However, a wide variety of word lengths are contemplated for W and H.

It is a basic mathematical fact that W is less than or equal to $2^{\alpha+1}$. A similar statement may be made for height H. Let $\beta$ be the bit position of the leading one in the binary representation of H. is less than or equal to $2^{\beta+1}$.

It follows that the triangle area $(½)WH$ is less than $(½)(2^{\alpha+1})(2^{\beta+1})=2^{\alpha+\beta+1}$. If the upper bound $2^{\alpha+\beta+1}$ is less than or equal to the TAB fragment capacity, the triangle area is automatically smaller than the TAB fragment capacity $N_{TAB}$:

$$(½)WH<2^{\alpha+\beta+1} \leq N_{TAB}.$$

Let $\gamma$ be the bit position of the leading one in the binary representation of $N_{TAB}$. Then $2^{\gamma} \leq N_{TAB}$, and $$(½)WH<2^{\alpha+\beta+1} \leq 2^{\gamma} \leq N_{TAB}.$$

Thus, the triangle area is guaranteed to be smaller than the TAB fragment capacity if $$2^{\alpha+\beta+1} \leq 2^{\gamma}.$$

However, the last inequality holds if and only if $\alpha+\beta+1 \leq \gamma$, or equivalently, $\alpha+\beta<\gamma$.

Thus, in one set of embodiments, vertex processor 162 may determine leading one positions $\alpha$ and $\beta$ for width W and height H respectively, and perform the comparison $\alpha+\beta<\gamma$. Observe that this comparison does not require any multipliers, and thus, may be performed quickly.

If the TAB fragment capacity $N_{TAB}$ is not a power of two, then $2^{\gamma}<N_{TAB}$. Thus, it is possible for a triangle to achieve the situation $2^{\gamma}<2^{\alpha+\beta+1} \leq N_{TAB}$, i.e. to fail the size comparison $\alpha+\beta<\gamma$ and yet have area upper bound $2^{\alpha+\beta+1}$ which is smaller than the TAB fragment capacity. Such a triangle would be unnecessarily subdivided into smaller pieces. Thus, it is advantageous for $N_{TAB}$ to equal a power of 2 because in this case $N_{TAB}$ exactly equals $2^{\gamma}$.

On average, the value $2^{\alpha+\beta+1}$ is a fairly generous upper bound for the triangle area $(½)WH$. Thus, it is possible for a triangle to achieve the situation $$(½)WH \leq 2^{\gamma}<2^{\alpha+\beta+1},$$

i.e. to fail the size comparison $\alpha+\beta<\gamma$ and yet have an area less than or equal to $2^{\gamma}$ which is a lower bound for the TAB fragment capacity. Thus, the triangle would be unnecessarily subdivided. For example, let W=H=4 and $N_{TAB}$=16 results in such a situation. This inefficiency (i.e. subdividing triangles that really do fit within the TAB fragment capacity) can be reduced by generating upper bounds for W and H which utilize more information than merely the leading one positions $\alpha$ and $\beta$ respectively. In other words, by creating mantissas of W and H and multiplying the mantissas, vertex processor 162 may more closely match the targeted inequality $(½)WH<2^{\gamma}$. This comes at the expense of the multipliers and barrel shifters needed to implement the refined computation. Let L represent the number of bits in the mantissa for W, and M the number of bits in the mantissa for H. As the numbers L and M increase the implementation cost increases but the rate of unnecessary subdivision decreases. Thus, the mantissa lengths L and M may be chosen to achieve an optimal tradeoff between cost and unnecessary subdivision rate. Various embodiments are contemplated with various values for mantissa lengths L and M.

Subdivision

If a size comparison test (i.e. any of the tests disclosed herein) for a triangle fails (i.e. the triangle has too many fragments or samples to be guaranteed of fitting into TAB 181), vertex processor 162 may subdivide the triangle (or submit a request to some external agent such as media processor 14 to subdivide the triangle) into smaller subtriangles.

In one embodiment, when the test fails, an exception may be generated and the primitive processing may be halted. This exception is detected by a processor (e.g. media processor 14) through a means such as an interrupt. The processor reads the geometry data of the primitive and subdivides the primitive into pieces. This involves computing appropriate color vectors for the newly generated vertices. These subdivided primitive pieces each individually are small enough to fit within TAB 181. The processor sends each subdivided primitive piece back to the hardware accelerator 18 for rasterization. When all the pieces have been sent and processed, hardware accelerator 18 may continue with the next primitive.

Method Flowchart

Figure 8:
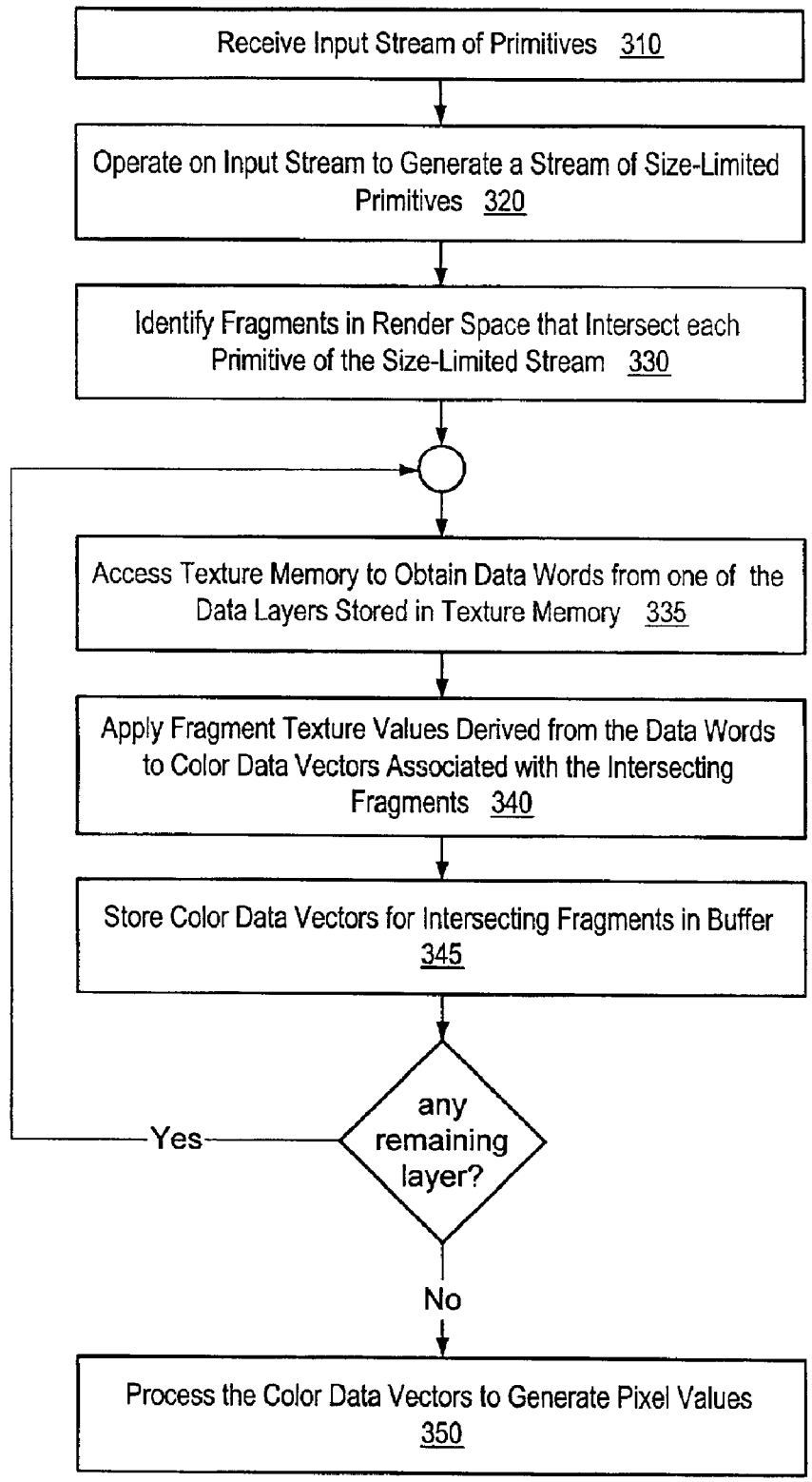
FIG. 8 illustrates one embodiment of a method for generating displayable images.

FIG. 8 illustrates one embodiment of a method for generating displayable images. In step 310, a stream of primitives may be received from an input bus (e.g. North Interface 160). In step 320, the input stream may be operated on to generate a size-limited stream of primitives. Each of the primitives in the size-limited stream has a size which is less than or equal to a fragment capacity of a buffer (e.g. the texture accumulation buffer 181).

For each primitive of the size-limited stream, the following operations may be performed. In step 330, one or more fragments which intersect the primitive in the rendering space may be identified. For example, in FIG. 7, eleven fragments intersect the given triangle. In step 335, a texture memory (e.g. texture memory 20) may be accessed to obtain data words from one of multiple layers of texture information stored in a texture memory. In step 340, fragment texture values derived from the data words (e.g. by filtration) may be applied to color data vectors associated with the intersecting fragments. In step 345, the updated color data vectors associated with the intersecting fragments may be stored in the buffer. Steps 335, 340 and 345 may be performed repeatedly for different ones of the texture information layers.

After a final iteration of steps 335 and 340, the final color data vectors may be used (e.g. filtered) to generate pixel values as indicated in step 350. The pixel values define a portion of a video signal. For example, video output processor 24 may generate a portion of a video signal using the pixel values and provide the video signal to a video output port. The video output port may couple to a display device such as a projector or monitor.

In one set of embodiments, step 320 (i.e. the step of operating on the input stream to generate the size-limited stream) may be implemented by (1) performing a size comparison on each primitive of the input stream to determine if an upper bound for the number of fragments intersecting the primitive is less than or equal to a lower bound for the capacity of the buffer, and (2) subdividing the primitive into subprimitives if the size comparison indicates that the upper bound is not less than or equal to the lower bound. The upper bound is a value greater than or equal to the number of fragments that intersect the primitive. Different upper bounds may be employed in different embodiments. The lower bound is a value less than or equal to the fragment capacity of the buffer. In some embodiments, the upper bound for the number of intersecting fragments equals the number of intersecting fragments, and/or, the lower bound for the buffer fragment capacity equals the buffer fragment capacity.

In some embodiments, the size comparison on a primitive of the input stream may be implemented by:

computing a width value and height value for the primitive;

determining a bit position $\alpha$ of a leading one in the width value;

determining a bit position $\beta$ of a leading one in the height value; and comparing a sum of the bit position $\alpha$ and the bit position $\beta$ to a threshold value.

The threshold value may equal the bit position $\gamma$ of the leading one in a binary representation of the buffer capacity. In one embodiment, the buffer capacity is a power of two. This implies that the buffer capacity exactly equals $2^\gamma$.

In other embodiments, the size comparison on a primitive of the input stream may be implemented by:

computing a width value and height value for the primitive, determining a bit position $\alpha$ of a leading one in the width value;

determining a bit position $\beta$ of a leading one in the height value;

generating an L-bit mantissa for the width value;

generating an M-bit mantissa for the height value;

computing the upper bound for the number of fragments intersecting the primitive using the bit position $\alpha$, the bit position $\beta$, the L-bit mantissa and the M-bit mantissa; and comparing the upper bound to the lower bound of the buffer capacity;

where L and M are integers greater than or equal to one.

In yet another set of embodiments, the size comparison on a primitive may be implemented by: (a) computing an area of the primitive; (b) determining an upper bound for the number of fragments intersecting the primitive by adding a positive marginal adjustment constant to the area; and (c) comparing the upper bound to a lower bound for the buffer capacity. The lower bound for the buffer capacity may be the buffer capacity itself.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the headings used herein are for organizational purposes only and are not meant to limit the description provided herein or the claims attached hereto.

What is claimed is:

1. A graphics system comprising:

a texture memory configured to store a plurality of image modification information (IMI) layers; and a hardware accelerator configured to receive a first stream of primitives, to operate on the first stream of primitives to generate a second stream of primitives that are limited in size to a value less than or equal to a fragment capacity of a texture accumulation buffer (TAB), and for each primitive of the second stream: (a) to identify fragments in a rendering space which intersect the primitive, (b) to access said texture memory to obtain data words from one of said IMI layers and apply fragment texture values derived from said data words to color data associated with the intersecting fragments, (c) to repeatedly perform (b) for different ones of said IMI layers, and (d) to store the color data associated with said intersecting fragments in the TAB between successive iterations of (b);

wherein the hardware accelerator is configured to operate on the first stream of primitives by performing a size comparison on each primitive of the first stream to determine if an upper bound for the number of said fragments intersecting the primitive is less than or equal to a lower bound for the fragment capacity of the TAB, and subdividing the primitive into subprimitives if the size comparison indicates that the upper bound is greater than the lower bound, wherein the subprimitives generated by said subdividing have fragment sizes that are less than or equal to the fragment capacity of the TAB; and wherein the color data for said intersecting fragments, after a final iteration of (b), is usable to determine at least a portion of a video output signal.

2. The graphics system of claim 1, wherein the hardware accelerator is configured to perform the size comparison on a first primitive of said first stream by computing a width value and height value for the first primitive, determining a first bit position of a leading one in the width value, determining a second bit position of a leading one in the height value, comparing a sum of the first bit position and the second bit position to a threshold value.

3. The graphics system of claim 2, wherein the threshold value equals a third bit position of a leading one in a binary representation of the fragment capacity of the TAB.

4. The graphics system of claim 3, wherein the fragment capacity of the TAB is a power of two.

5. The graphics system of claim 1, wherein the hardware accelerator is configured to perform the size comparison on a first primitive of said first stream by computing a width value and a height value for the first primitive, determining a first bit position of a leading one in the width value, determining a second bit position of a leading one in the height value, generating a first L-bit mantissa for the width value, generating a second M-bit mantissa for the height value, computing the upper bound for the number of said fragments intersecting the primitive from said first bit position, second bit position, first mantissa and second mantissa, and comparing the upper bound to the lower bound for the fragment capacity of the TAB, wherein L and M are integers greater than or equal to one.

6. The graphics system of claim 1, wherein the hardware accelerator is configured to perform the size comparison on a first primitive of said first stream by computing an area of the first primitive, adding a positive marginal adjustment constant to the area, and comparing the marginally adjusted area to the lower bound for the fragment capacity of the TAB.

7. The graphics system of claim 1, wherein the lower bound for the fragment capacity of the TAB equals the fragment capacity of the TAB.

8. The graphics system of claim 1, wherein the color data associated with the intersecting fragments are color vectors for samples populating said intersecting fragments, wherein the graphics system further comprises a frame buffer, wherein the hardware accelerator is further configured to:
  store the color vectors of the samples, after the final iteration of (b) and (c), in a sample area of the frame buffer;
  read and filter the color vectors of the samples to determine pixel values; and
  store the pixel values in a pixel area of the frame buffer.

9. The graphics system of claim 1 further comprising a video output processor configured to read the pixel values from the pixel area of the frame buffer and generate said at least a portion of the video signal from the pixels, and to provide the video output signal to a video output port.

10. The graphics system of claim 1, wherein the hardware accelerator is an application specific integrated circuit (ASIC), wherein the TAB is implemented on the ASIC.

11. The graphics system of claim 1, wherein said hardware accelerator is configured to complete application of fragment values corresponding to a $K^{th}$ layer of said IMI layers to said interior samples prior to initiating application of fragment values corresponding to a $(K+1)^{st}$ layer of said IMI layers to said interior samples, wherein K is an index which represents any of said IMI layers prior to the last IMI layer.

12. A method for generating graphical images, the method comprising:
  receiving a first stream of primitives;
  operating on the first stream of primitives to generate a second stream of primitives that are limited in size to a value less than or equal to a capacity of a buffer;
  wherein said operating on the first stream of primitives comprises:
  performing a size comparison on each primitive of the first stream to determine if an upper bound for the number of said fragments intersecting the primitive is less than or equal to a lower bound for the capacity of the buffer;
  subdividing the primitive into subprimitives if the size comparison indicates that the upper bound is not less than or equal to the lower bound; and
  wherein the subprimitives generated by said subdividing have fragment sizes that are less than or equal to the capacity of the buffer; and
  for each primitive of the second stream:
    (a) identifying one or more fragments in a rendering space which intersect the primitive;
    (b) accessing a texture memory to obtain data words from one of a plurality of layers of texture information stored in the texture memory;
    (c) applying fragment texture values derived from said data words to color data associated with the intersecting fragments;
    (d) repeatedly performing (b) and (c) for different ones of said layers, and
    (e) storing the color data associated with said intersecting fragments in the buffer between successive iterations of (b) and (c);
    wherein the color data for said intersecting fragments, after a final iteration of (b) and (c), is usable to determine at least a portion of a video output signal.

13. The method of claim 12, wherein said performing the size comparison on a first primitive of said first stream comprises:
  computing a width value and height value for the first primitive;
  determining a first bit position of a leading one in the width value;
  determining a second bit position of a leading one in the height value; and
  comparing a sum of the first bit position and the second bit position to a threshold value.

14. The method of claim 13, wherein the threshold value equals a third bit position of a leading one in a binary representation of the capacity of the buffer.

15. The method of claim 14, wherein the capacity of the buffer is a power of two.

16. The method of claim 12, wherein said performing the size comparison on a first primitive of said first stream comprises:
  computing a width value and height value for the first primitive, determining a first bit position of a leading one in the width value;
  determining a second bit position of a leading one in the height value;
  generating a first L-bit mantissa for the width value;
  generating a second M-bit mantissa for the height value;
  computing the upper bound for the number of said fragments intersecting the primitive based on said first bit position, second bit position, first mantissa and second mantissa; and
  comparing the upper bound to the lower bound, wherein L and M are integers greater than or equal to one.

17. The method of claim 12, wherein said performing the size comparison on a first primitive of said first stream comprises:
  computing an area of the first primitive;
  determining the upper bound by adding a positive marginal adjustment constant to the area; and
  comparing the upper bound to the lower bound for the capacity of the buffer.

18. The method of claim 17, wherein the lower bound for the capacity of the buffer equals the capacity of the buffer.

19. A graphics system comprising:
  a texture memory configured to store a plurality of texture layers; and
  a hardware accelerator configured to receive a first primitive, to perform a size comparison on the first primitive to determine if an upper bound for a fragment size of the first primitive is less than or equal to a lower bound for a fragment capacity of a texture accumulation buffer (TAB), and to subdivide the first primitive into subpnmitives in response to the size comparison indicating that the upper bound is not less than or equal to the lower bound;

wherein, for each of the subprimitives, the hardware accelerator is further configured to determine fragments in a rendering space which interact with the subprimitive, to apply multiple layers of texture accessed from the texture memory to the intersecting fragments, wherein said applying multiple layers of texture comprises completing application of one of said texture layers to the intersecting fragments before initiating application of a next of said texture layers to the intersecting fragments;

wherein the hardware accelerator is configured to perform the size comparison on a first of said subprimitives by computing a width value and height value for the first subprimitive, determining a first bit position of a leading one in the width value, determining a second bit position of a leading one in the height value, comparing a sum of the first bit position and the second bit position to a threshold value; and wherein the hardware accelerator is further configured to store color data for the intersecting fragments in the TAB between the application of successive texture layers, wherein the color data for the intersecting fragments is usable to define a portion of a displayable image.

20. The graphics system of claim 19, wherein the subprimitives generated by said subdividing have fragment sizes that are less than or equal to the fragment capacity of the TAB.

21. The graphics system of claim 19, wherein the hardware accelerator is configured to perform the size comparison on a first of said subprimitives by computing a width value and height value for the first subprimitive, determining a first bit position of a leading one in the width value, determining a second bit position of a leading one in the height value, generating a first L-bit mantissa for the width value, generating a second M-bit mantissa for the height value, computing the upper bound for the number of said fragments intersecting the first subprimitive based on said first bit position, second bit position, first mantissa and second mantissa, and comparing the upper bound to the lower bound for the fragment capacity of the TAB, where L and M are integers greater than or equal to one.

22. The graphics system of claim 19, wherein the hardware accelerator is configured to perform the size comparison on a first of said subprimitives by computing an area of the first subpnmitive, computing the upper bound by adding a positive marginal adjustment constant to the area, and comparing the upper bound to the lower bound for the fragment capacity of the TAB.

23. An apparatus comprising:

a texture memory configured to store a plurality of data layers;

a vertex processor configured to receive a first stream of primitives, to operate on the first stream of primitives to generate a second stream of primitives that are limited in size to a value less than or equal to a capacity of a buffer;

a render pipe, wherein for each primitive of the second stream, the render pipe is configured to identify fragments in a rendering space which intersect the primitive; and a texture pipe, wherein for each primitive of the second stream, the texture pipe is configured (a) to access said texture memory to obtain data words from one of said data layers and (b) apply fragment texture values derived from said data words to color data associated with the fragments intersecting the primitive;

wherein the vertex processor is configured to operate on the first stream of primitives by performing a size comparison on each primitive of the first stream to determine if an upper bound for a fragment size of the primitive is less than or equal to a lower bound for the capacity of the buffer, and subdividing the primitive into subprimitives if the upper bound is not less than or equal to the lower bound, wherein the subprimitives generated by said subdividing have fragment sizes that are less than or equal to the capacity of the buffer;

wherein the texture pipe is configured to repeatedly perform (a) and (b) for different ones of said data layers and to store the color data associated with said intersecting fragments in the buffer between successive iterations of (a) and (b); and wherein the color data for said intersecting fragments, after a final iteration of (a) and (b), is usable to determine at least a portion of a video output signal.

24. The apparatus of claim 23, wherein the data layers comprise layers of texture information.

25. The apparatus of claim 23, wherein the capacity of the buffer is a maximum number of fragments storable in the buffer.

26. The apparatus of claim 23, wherein the vertex processor is configured to perform the size comparison on a first primitive of said first stream by computing a width value and height value for the first primitive, determining a first bit position of a leading one in the width value, determining a second bit position of a leading one in the height value, comparing a sum of the first bit position and the second bit position to a threshold value.

27. The apparatus of claim 23, wherein the vertex processor is configured to perform the size comparison on a first primitive of said first stream by computing a width value and height value for the first primitive, determining a first bit position of a leading one in the width value, determining a second bit position of a leading one in the height value, generating a first L-bit mantissa for the width value, generating a second M-bit mantissa for the height value, computing the upper bound for the fragment size of the primitive based on said first bit position, second bit position, first mantissa and second mantissa, and comparing the upper bound to the lower bound for the capacity of the buffer, wherein L and M are integers greater than or equal to one.

28. A graphics system comprising:

a texture memory configured to store a plurality of texture layers; and a hardware accelerator configured to receive a first primitive, to perform a size comparison on the first primitive to determine if an upper bound for a fragment size of the first primitive is less than or equal to a lower bound for a fragment capacity of a texture accumulation buffer (TAB), and to subdivide the first primitive into subprimitives in response to the size comparison indicating that the upper bound is not less than or equal to the lower bound;

wherein, for each of the subprimitives, the hardware accelerator is further configured to determine fragments in a rendering space which interact with the subprimitive, to apply multiple layers of texture accessed from the texture memory to the intersecting fragments, wherein said applying multiple layers of texture comprises completing application of one of said texture layers to the intersecting fragments before initiating application of a next of said texture layers to the intersecting fragments;

wherein the hardware accelerator is further configured to perform the size comparison on a first of said subprimitives by computing a width value and height value for the first subprimitive, determining a first bit position of a leading one in the width value, determining a second bit position of a leading one in the height value, generating a first L-bit mantissa for the width value, generating a second M-bit mantissa for the height value, computing the upper bound for the number of said fragments intersecting the first subprimitive based on said first bit position, second bit position, first mantissa and second mantissa, and comparing the upper bound to the lower bound for the fragment capacity of the TAB, where L and M are integers greater than or equal to one; and wherein the hardware accelerator is further configured to store color data for the intersecting fragments in the TAB between the application of successive texture layers, wherein the color data for the intersecting fragments is usable to define a portion of a displayable image.

29. The graphics system of claim 28, wherein the subprimitives generated by said subdividing have fragment sizes that are less than or equal to the fragment capacity of the TAB.

30. The graphics system of claim 28, wherein the hardware accelerator is configured to perform the size comparison on a first of said subprimitives by computing an area of the first subprimitive, computing the upper bound by adding a positive marginal adjustment constant to the area, and comparing the upper bound to the lower bound for the fragment capacity of the TAB.

* * * * *